June 1, 1937.  T. C. ANGUS  2,082,374
EXHAUST VENTILATING HOOD FOR INDUSTRIAL AND OTHER PURPOSES
Filed July 23, 1936  2 Sheets-Sheet 1
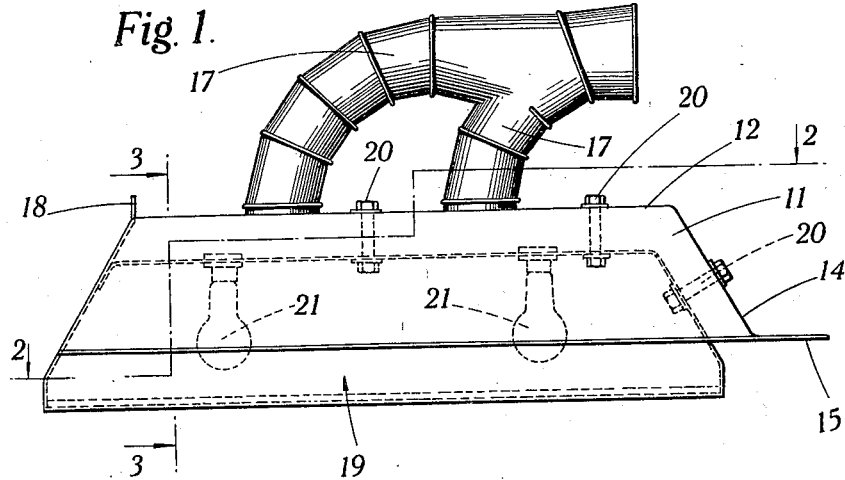
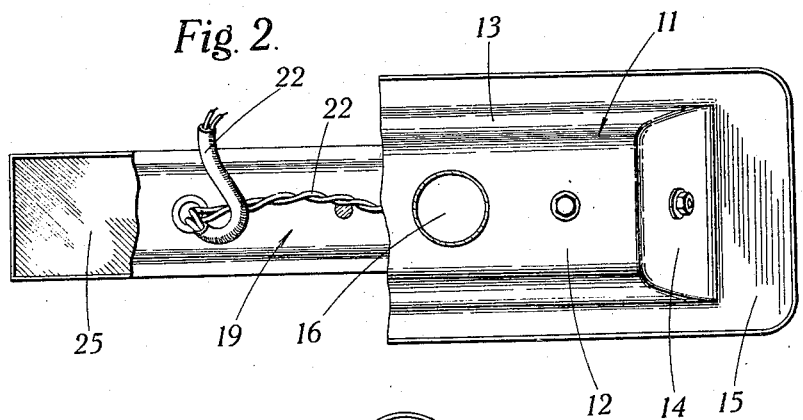
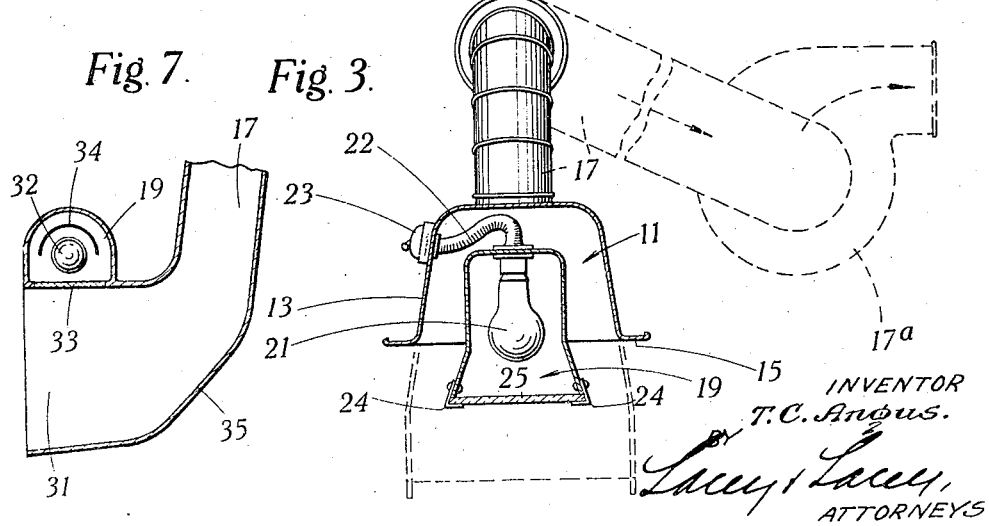
INVENTOR
T. C. Angus.
BY Lacey & Lacey,
ATTORNEYS

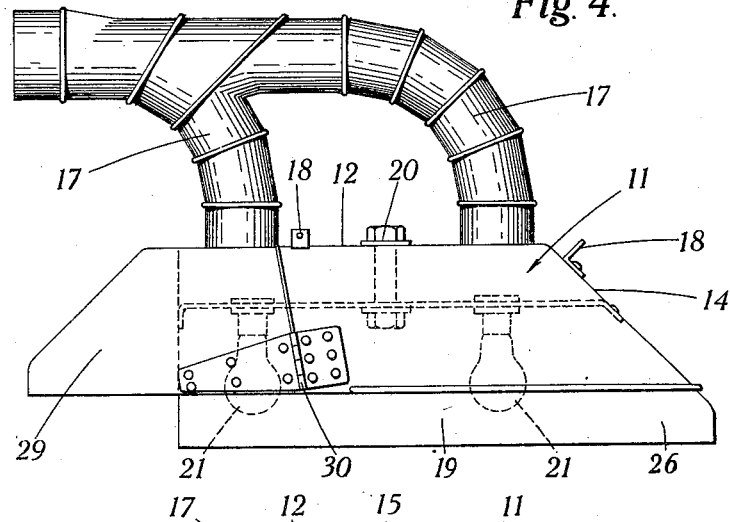
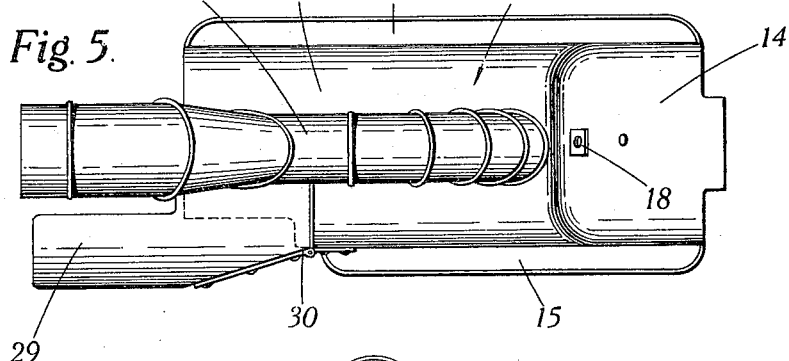
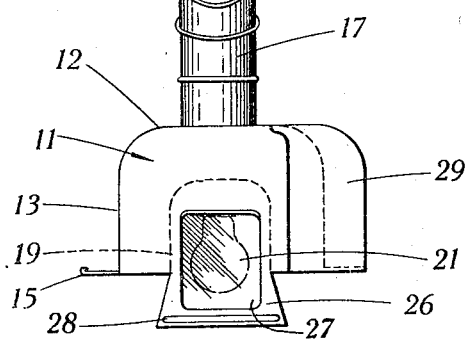

Patented June 1, 1937

2,082,374

UNITED STATES PATENT OFFICE 2,082,374

EXHAUST VENTILATING HOOD FOR INDUSTRIAL AND OTHER PURPOSES

Thomas Cochrane Angus, Lambourne End, England

Application July 23, 1936, Serial No. 92,256
In Great Britain February 15, 1935

1 Claim. (Cl. 98—115)

This invention relates to exhaust ventilating hoods for industrial and other purposes, particularly where fume-producing, dust-producing or other operations have to be carried out in close proximity to an exhaust hood or the like, and at the same time require inspection. In such cases as these difficulty is often experienced in suitably illuminating the work, and it is the object of the present invention to provide an improved method and means whereby this illumination may readily be effected in a most efficient and convenient manner.

An advantage afforded by my invention distinguishing it from hoods in present use is that the disposition and design of the air inlets are such that large volumes of air are caused to move with a comparatively low velocity, rather than small volumes of air at high velocity. The effect of this is that the head of an operative working under or near a hood is surrounded in a gently moving volume of air drawn from behind the operative and so uncontaminated by whatever dust or fume is being generated upon the operative's table. The operative therefore breathes the air of the room entirely uncontaminated by whatever work he happens to be engaged upon. This is accomplished without objectionable draughts or chilling of the fingers or other parts of the body and also gives a large effective space in which work may be done and its dust hazard properly safeguarded.

It has hitherto been proposed to provide gas lamps, for use in art galleries and the like, with means whereby the fumes are drawn off, and a current of air is induced for ventilating the room, but to such arrangements I make no claim.

The invention accordingly provides an improved exhaust ventilating hood for industrial purposes, in which the inlet of the hood is mounted closely adjacent dust or fume producing operations and the outlet of the hood is in communication with one or more exhaust fans or equivalent draught-producing means, the hood being fitted with one or more holders for electric lamps which are so positioned that lamps carried thereby will direct light in the vicinity of the inlet of the hood. The invention further provides a construction of exhaust hood for industrial purposes in which said hood is formed with an auxiliary compartment housing illuminating means adapted to direct light through a transparent wall of said compartment to the vicinity of the inlet of the hood.

The invention will now be described with reference to the accompanying drawings, wherein:—

Figure 1 is a side elevation of one embodiment;
Figure 2 is broken-away plan on the line 2—2 of Figure 1; and
Figure 3 is a transverse section on the line 3—3 of Figure 1; while
Figure 4 is a side elevation of a second embodiment;
Figure 5 is a plan, and
Figure 6 is an end elevation.
Figure 7 is a fragmentary detail sectional view showing a further embodiment of the invention.

Referring to Figures 1, 2 and 3, there is shown a ventilating hood 11 which is open at the bottom, having a roof 12, side walls 13, end walls 14, and a horizontal flange 15 outstanding from the side walls and from one of the end walls. In the roof 12 are one or more openings 16 leading through pipes 17 to an exhaust fan indicated at 17a in Figure 3 and discharging to the outside air, or to a purifier or the like (not shown). Suitable eyes 18 are secured to the hood to provide means for attaching supporting wires by which the hood is suspended over the table or bench upon which work needing ventilation is progressing.

Within the hood 11 is fixed a lamp-casing 19, held in fixed spaced relation with the hood by means of bolts 20 as shown, or by other mechanical means. The casing 19 contains one or more electric lamps 21 secured in the roof of the casing and connected by leads 22 to a switch 23 on the outside of the ventilating hood in a conveniently accessible position. The bottom of the side-walls of the lamp casing 19 carry inwardly directed brackets or flanges 24, and upon the brackets rests a sheet 25 of glass or other transparent material forming the bottom of the casing.

The lamp casing projects downwardly beneath the bottom of the ventilating hood and is in plan arranged, except at that end at which the hood is not flanged, and where the end wall of the hood forms also the end wall of the lamp casing, in a substantially central position, so that the casing is surrounded on three sides by a ventilating channel up which impure air can pass to the pipes 17. This has the advantage that the intensity of suction is most concentrated where there is most likelihood of fumes or dust escaping into the atmosphere. Moreover, the fact that the illuminant is substantially central with regard to the hood area causes the operator to hold the work or equivalent correspondingly, thereby promoting efficient ventilation.

In Figures 4–6, showing a somewhat modified embodiment, like reference numerals have been used for corresponding parts. It will be noticed in this case that the flanges 15 are provided along the sides only of the hood, while at both ends a common wall is provided to both hood and casing, the wall at the left-hand end in Figure 4 being upright and having a downward extension 26 (Figure 6) for the lower part of the lamp casing. This wall has a window 27, of glass or other transparent material, and a horizontal slot 28 for receiving the glass bottom of the casing.

The most important difference between this embodiment and that previously described consists in an extension 29, hinged at 30 to the main part of the hood and formed so that it offers a ventilating air passage continuous with one of the marginal ventilating spaces defined by the side walls of the hood and of the lamp casing. A suitable spring is incorporated in the hinge to hold the extension in the closed position as shown, but not to present too strong a resistance to opening for purposes of access.

It will be understood that the invention may take numerous other forms. For example, in cases where excessive heat is generated by the illuminating means, this may be disposed of by the provision of ventilating ducts passing from the auxiliary hood or shade into the main hood, or alternatively into the atmosphere, while for the same purpose fins or equivalent heat-conducting surfaces may be provided upon the exterior and/or interior of the auxiliary hood.

In some cases the hood may be constructed at least in part from transparent material, such as glass, the illuminating means preferably being shielded from the operator's eyes. This construction enables the sides of the hood to extend downwardly well below the face of the operator without obstructing the use of his arms or preventing him from inspecting the work through the transparent wall or walls of the hood. Thus in Figure 3, the hood 11 may be extended as indicated in dotted lines beneath the hood in Figure 3 of the drawings, a part or the whole of the extension being formed from transparent material so that the operator can see through it.

In an alternative construction of hood illustrated in Figure 7 in which the mouth 31 is disposed approximately in an upright plane, the illuminating means, which can conveniently be constituted by an elongated tubular lamp 32, or a plurality of bulbs in an elongated reflector, is disposed within a subsidiary compartment 19, one wall 33 of which is transparent and forms a part of the main hood, reflectors 34 or other convenient means being arranged to direct the light on to the work, which latter should be thus held actually within or in front of the hood to obtain the best illumination. As before, the walls of the hood may be formed partly or completely from transparent material, such as glass, so that the exhaust may be concentrated around the work without impairing the vision of the operator, and thus enabling him to keep his nose and mouth always well away from the fumes or dust. In such a construction the back 35 or boundary of the hood farthest removed from the operative may be carried down and towards the operative at an angle, so restricting the effective area of inlet and saving power in air to be handled. This extension 35 is coloured so as to form a background of suitable brightness for the work in progress, it having recently been shown that it is beneficial to provide a background returning to the eye of the worker a brightness only slightly less than the brightness of the work-piece under manufacture.

The invention is, of course, not limited to the construction above described, but may be employed with any form or shape of industrial suction hood, the illuminating means being arranged so that the maximum intensity of illumination is obtained upon the work when the latter is held within the space most effectively ventilated by the hood. In this it is to be observed that the shape of the hood may be modified so as to control the area and degree of illumination, preferably in such a manner that only the efficiently ventilated space adjacent the hood is satisfactorily lighted.

What I claim is:—

A device of the class described including a ventilating hood having side and end walls and a roof, said roof being formed with an opening and said hood having an open bottom defining an inlet portion, an exhaust pipe connected with the roof, a casing carried by the hood and being centrally mounted therein to define a ventilating channel, said casing and hood having a common end wall, an extension carried by the hood and defining a ventilating air passage continuous with a section of said ventilating channel, means connected with the exhaust pipe for inducing air flow upwardly through the ventilating channel about the casing and through the hood and through said exhaust pipe, said extension being hingedly connected to the hood, and means normally retaining the extension in a closed position, said means being resilient for permitting swinging of the hood for purposes of access.

THOMAS COCHRANE ANGUS.